United States Patent
Ito et al.

(10) Patent No.: US 6,202,626 B1
(45) Date of Patent: Mar. 20, 2001

(54) ENGINE HAVING COMBUSTION CONTROL SYSTEM

(75) Inventors: Takeshi Ito; Toshiharu Hanajima; Kenji Mori, all of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/025,064

(22) Filed: Feb. 17, 1998

Related U.S. Application Data

(63) Continuation-in-part of application No. 09/016,199, filed on Jan. 30, 1998, now Pat. No. 6,131,554.

(30) Foreign Application Priority Data

Jan. 31, 1997 (JP) ................................................... 9-018552
Feb. 14, 1997 (JP) ................................................... 9-030856

(51) Int. Cl.[7] .............................. F02D 9/08; F02B 31/02; F02B 47/08; F02L 1/02
(52) U.S. Cl. ...................... 123/336; 123/442; 123/90.31; 123/188.14; 123/306; 123/568.14
(58) Field of Search ................................... 123/336, 442, 123/400, 403, 463, 90.27, 90.31, 306, 308, 568.14, 497, 456, 432, 583, 579, 188.14, 492, 682, 406.74; 477/110

(56) References Cited

U.S. PATENT DOCUMENTS

| | | | |
|---|---|---|---|
| 3,664,316 | * | 5/1972 | Garcea .................................. 123/585 |
| 4,144,847 | * | 3/1979 | Hosaka . |
| 4,276,862 | * | 7/1981 | Matsumoto ........................... 123/432 |
| 4,378,000 | * | 3/1983 | Moriya et al. ......................... 123/442 |
| 4,520,775 | * | 6/1985 | Nakamura .............................. 123/308 |
| 4,528,958 | * | 7/1985 | Yoshida et al. ........................ 123/442 |
| 4,596,164 | * | 6/1986 | Hasegawa et al. ..................... 477/98 |
| 4,627,396 | * | 12/1986 | Yoshida ................................. 123/302 |
| 4,660,530 | * | 4/1987 | Sugiyama et al. ..................... 123/432 |
| 4,716,864 | * | 1/1988 | Binder ................................. 123/90.31 |
| 4,723,517 | * | 2/1988 | Frost .................................... 123/90.31 |
| 4,825,834 | * | 5/1989 | Toshimitsu et al. .................. 123/463 |
| 4,840,146 | * | 6/1989 | Yanagisawa et al. ................. 123/336 |
| 4,848,505 | * | 7/1989 | Yoshizawa et al. ................... 180/197 |
| 4,883,039 | * | 11/1989 | Toshimitsu et al. .................. 123/463 |
| 4,969,437 | * | 11/1990 | Kolb ..................................... 123/399 |
| 4,982,331 | * | 1/1991 | Miyazaki ............................. 701/102 |
| 5,005,533 | * | 4/1991 | Suzuki et al. ..................... 123/184.22 |
| 5,209,213 | * | 5/1993 | Miyashita et al. .................... 123/687 |
| 5,295,416 | * | 3/1994 | Miyashita et al. .................... 477/100 |
| 5,635,634 | * | 6/1997 | Reuschenbach et al. ........... 73/118.2 |
| 5,699,768 | * | 12/1997 | Saito et al. ............................ 123/400 |
| 5,829,409 | * | 11/1998 | Saito et al. ............................ 123/396 |

\* cited by examiner

Primary Examiner—Willis R. Wolfe
Assistant Examiner—Hai Huynh
(74) Attorney, Agent, or Firm—Knobbe, Martens, Olson & Bear LLP

(57) ABSTRACT

An internal combustion engine that is comprised of a combustion chamber formed by a cylinder bore closed at one end by a cylinder head and by a piston reciprocating in the cylinder bore. At least one intake passage serves the combustion chamber through an intake port valved by an intake valve. A throttle valve is provided in the intake passage upstream of the intake port and is movable between an opened, full throttle position and a closed, idle position for controlling the flow through the intake passage into the combustion chamber. At least one exhaust passage serves the combustion chamber through an exhaust port. An exhaust valve controls the flow through the exhaust port. Valve actuating means are provided for operating the intake valve and the exhaust valve between their open and closed positions. The portion of the intake passage between the throttle valve and the intake port (intake passage volume) and the maximum volume of the combustion chamber when the piston is at its bottom dead center position (exhaust gas volume) are set to a predetermined ratio. The described constructions permit a very compact construction that permits the intake passage volume to be kept small to achieve the desired ratio.

43 Claims, 16 Drawing Sheets

ENGINE HAVING COMBUSTION CONTROL SYSTEM

CROSS-REFERENCE TO RELATED APPLICATION

This application is a continuation-in-part of our application of the same title, Ser. No. 09/016,199, filed Jan. 30, 1998 now U.S. Pat. No. 6,131,554 and assignd to the assignee hereof.

BACKGROUND OF THE INVENTION

This invention relates to an engine having a combustion control system and more particularly to an improved, compact engine design that permits the use of such a combustion control system.

As is noted in the aforenoted copending parent application, it has been found that the performance of an engine can be significantly improved by appropriately selecting the ratio of area of the intake passage between the throttle valve and the intake valve seat or port and the exhaust volume of the combustion chamber. The exhaust volume is the displacement volume of the cylinder when the piston at bottom dead center position. If this ratio is appropriately selected relative to the valve overlap period, internal exhaust gas recirculation can be optimized and stable lean burn running can be achieved.

In order to obtain the optimum ratio of these respective volumes, which ratio preferably is in the range of 0.15 to 0.45, it is necessary to position the closed condition of the throttle valve quite close to the intake valve seat. Optimally, this could be accomplished by rotatably journaling the throttle valves directly in the cylinder head. However, this is not practical for many reasons. Therefore, the throttle valves are normally positioned in one or more separate throttle bodies that are affixed to the side of the cylinder head. This tends to increase the volume of the intake passage to such an extent that the desired ratio cannot be maintained.

It is, therefore, a principal object of this invention to provide an improved, compact and nevertheless separate throttle body arrangement for an internal combustion engine.

It is a further object of this invention to provide an improved throttle valve and throttle body construction for an engine wherein the throttle body can be positioned so that the throttle valve in its closed position is disposed within a plane that extends parallel to the axis of the cylinder bore and which contains the outer peripheral edge of the cylinder head.

In addition to the desirability of maintaining the aforenoted ratio, there are also a number of other reasons why it may be desirable to position the throttle valve in close proximity to the intake valve seat. Where the engine has multiple cylinders, this frequently necessitates the use of multiple throttle bodies in order to maintain this relationship.

It is, therefore, a further object of this invention to provide a multi-cylinder engine having multiple throttle bodies and wherein the throttle bodies are positioned so that there respective throttle valves, when in their idle positions, are disposed inwardly from a plane parallel to the axis of the cylinder bore and containing the outer peripheral edge of the cylinder head on the intake side.

Where the throttle bodies and throttle valves are positioned in close proximity to the cylinder head, this may give rise to some additional difficulties in placement and operation of other components. For example, it is necessary when utilizing multiple throttle bodies to have a synchronizing mechanism so that the throttle valve shafts all operate in unison and have the desired relationship. It is also necessary to employ the mechanism for operating the throttle valves. The placement of this operating mechanism can be complicated when the throttle valves are positioned in such close proximity to the cylinder head.

It is, therefore, a still further object of this invention to provide an improved throttle valve arrangement and an actuating mechanism for actuating the throttle valve that is more freely accessible.

It is a still further object of this invention to provide an improved throttle valve actuating mechanism wherein the throttle valve shafts are operated by a separate throttle valve actuating shaft that is journaled for rotation about an axis parallel to but spaced from the axes of the throttle valve shafts.

The problems of throttle synchronization and throttle valve actuation are further complicated when the engine is provided with one or more overhead camshafts. Since the camshafts are driven at one-half crankshaft speed, a speed reducing mechanism must be employed between the crankshaft and the camshafts. This is normally done by sprockets that are driven by one or more flexible transmitters either chains or belts.

The size of these sprockets and their mounting in the cylinder head tends to enlarge the overall size of the cylinder head. In fact, the sprocket drive frequently will lie over and outwardly of the throttle valves when they are placed in the desired location close to the intake valve seats. This presents still further difficulties in connection with the placement and operation of the throttle actuating mechanism.

Also, it is frequently the practice to employ a control system for the engine that requires an input information from a throttle position sensor. The positioning of this sensor is also complicated by the close positioning of the throttle valves to the intake valves.

It is, therefore, a still further object of this invention to provide an improved arrangement for providing a compact engine construction and which accommodates a throttle position sensor associated with at least one of the engine throttle valve shafts.

In connection with the combustion control system for an engine it has also been the practice to employ fuel injection. Fuel injection permits more accurate control of the amount and timing of fuel delivery than carburetors. In addition, it is much easier to adapt the fuel injection to transient conditions than with carburation.

Where fuel injection is employed and the fuel is injected into the intake passage, the accuracy of the amount of fuel injected can be improved significantly if the fuel is delivered at a pressure that is related to the induction system pressure so that a predetermined pressure relationship exists between the injection pressure and the induction system pressure.

It is, therefore, a still further object of this invention to provide improved arrangement for controlling the fuel supply pressure to a fuel injector that injects into an induction passage so that a predetermined pressure differential exists between the injection pressure and the induction system pressure.

In spite of the advantages of fuel injection, there is a problem as to the depositing of fuel on either the intake passage or portions of the intake system or on the walls within the combustion chamber. Sometimes it is not desirable to have such fuel deposition. However, at other times it is desirable to deposit the fuel, particularly on the walls of the intake system. By so depositing the fuel, acceleration performance can be improved when operating in transient conditions from a given speed to an increased speed or power output.

With manifold type injection, this has been attempted to be accomplished by spraying fuel on the intake valve. However, this is not a particularly desirable expedient because of the fact that the flow across the intake valve may not be uniform and in fact may be desired to be non-uniform under some running conditions.

It is, therefore, a still further object of this invention to provide an improved fuel injection system wherein the fuel can be injected onto a wall of the throttle valve so that when the throttle valve position is changed, the flow across the throttle valve will sweep the fuel into the intake mixture more uniformly and more rapidly.

When this is done, however, the strategy of injection timing should be different when the engine is operating under load and transient conditions rather than when it is not operating under a load and when there are transient conditions. It is, therefore, yet another object of this invention to provide an improved fuel injection system wherein the fuel injection is varied under transient conditions and the amount of variance is changed depending upon whether the engine is operating under a load or not.

SUMMARY OF THE INVENTION

A number of the features of the invention are adapted to be embodied in an internal combustion engine that is comprised of a combustion chamber formed by a cylinder bore closed at one end by a cylinder head and by a piston reciprocating in the cylinder bore. At least one intake passage serves the combustion chamber through an intake port valved by an intake valve. A throttle valve is provided in the intake passage upstream of the intake port and is movable between an opened, full throttle position and a closed, idle position for controlling the flow through the intake passage into the combustion chamber. At least one exhaust passage serves the combustion chamber through an exhaust port. An exhaust valve controls the flow through the exhaust port. Valve actuating means are provided for operating the intake valve and the exhaust valve between their open and closed positions. The portion of the intake passage between the throttle valve and the intake port (intake passage volume) and the maximum volume of the combustion chamber when the piston is at its bottom dead center position (exhaust gas volume) are set to a predetermined ratio.

In accordance with a first feature of the invention embodied in an engine as described above, the throttle valve is supported in a separate throttle body that is affixed to the cylinder head. The throttle valve is positioned inwardly of a plane that extends parallel to the cylinder bore axis and contains the outer peripheral edge of the cylinder on the intake passage side when the throttle valve is in its closed idle position to provide a compact construction and the desired low intake passage volume.

In accordance with another feature of the invention embodied in the engine as described, the throttle valve is journaled on a throttle valve shaft that is positioned closely adjacent one side of the cylinder head. A throttle valve actuating shaft is journaled for rotation about a throttle valve actuating shaft which is disposed parallel to the axis of the throttle valve shaft and disposed on the side of the intake passage outwardly from the cylinder head. Motion transmitting means transmits rotation of the throttle valve actuating shaft into rotation of the throttle valve shaft.

In accordance with yet another feature of the invention embodied in an engine as described above, the actuating means for the valves includes at least one camshaft rotatably journaled within the cylinder head and driven by a flexible transmitter that is trained around the sprocket fixed for rotation with the one camshaft. A throttle valve actuating mechanism is disposed for operating the throttle valve and is positioned in proximity to the flexible transmitter. A throttle position sensor cooperates with the shaft of the throttle valve and is disposed in a spaced relationship to the flexible transmitter and the throttle valve actuating mechanism.

In accordance with a further feature of the invention adapted to be embodied in an engine of the type described, a fuel injector is provided for injecting fuel into the intake passage. A fuel supply system supplies fuel to the fuel injector. This fuel supply system includes a pressure regulator that regulates the pressure of the fuel delivered to the fuel injector to be at a predetermined relationship to the pressure in the intake passage downstream of the throttle valve.

In accordance with still another feature of the invention that is adapted to be embodied in an engine as described, a fuel injector is mounted to spray fuel into the intake passage. The fuel injector is disposed so as to inject fuel on an upstream side of the throttle valve when the throttle valve is in its idle position for improving fuel distribution upon acceleration.

Another feature of the invention is adapted to be embodied in a control system for controlling the fuel/air mixture delivered to an engine combustion chamber. The control system includes sensors for sensing a variety of engine running conditions. The fuel/air ratio is varied in response to those sensed running conditions. In addition, the sensing of a transient condition is also accomplished and the fuel/air ratio set in response to the predetermined conditions is varied in response to sensed transient conditions. Also, means are provided for determining whether the engine is under a load or not. The transient variation is changed depending upon whether an engine load is sensed or not sensed.

DETAILED DESCRIPTION OF THE PREFERRED EMBODIMENTS

Figure 1:
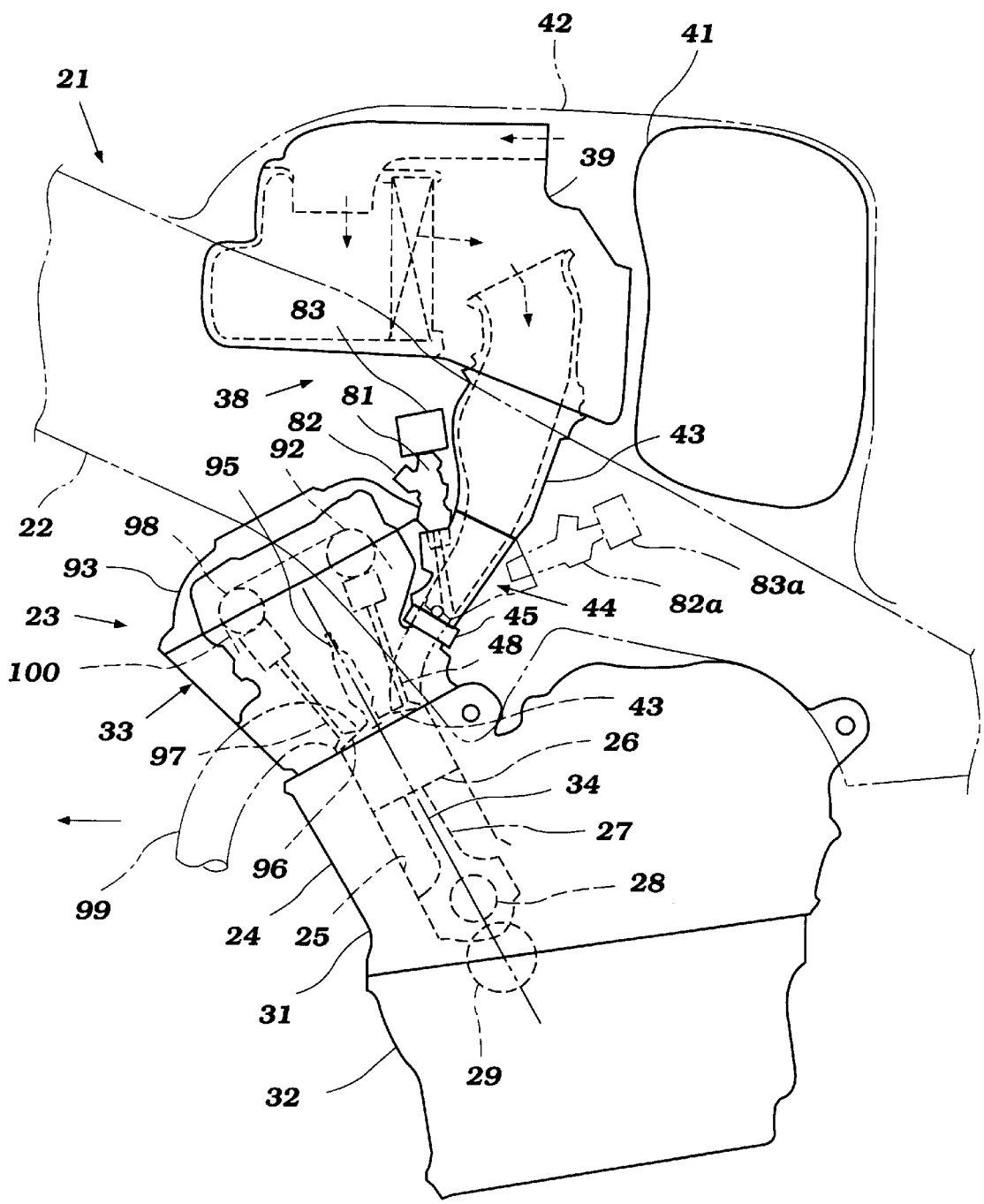
FIG. 1 is a side elevational view of a portion of a motorcycle powered by an internal combustion engine constructed in accordance with a first embodiment of the invention with the engine and certain auxiliary shown in solid lines and the associated portion of the motorcycle shown in phantom.

Referring now in detail to the drawings and initially to the embodiment of FIGS. 1–6 and primarily to FIG. 1, a motorcycle is depicted partially and primarily in phantom. The motorcycle includes a frame assembly, indicated generally by the reference numeral 21 which includes a main frame tube 22 from which an internal combustion engine, constructed in accordance with an embodiment of the invention and indicated generally by the reference numeral 23, is suspended for powering the motorcycle.

The invention is described in conjunction with a motorcycle because the invention has particular utility in applications where the engine is called to operate over a widely varying range of speeds and loads with good efficiency under all running conditions. Also, certain facets of the invention have particular utility with compact engine constructions and motorcycles demand such compact construction. It will be apparent, however, from the following description how the invention can be practiced in conjunction with a wide variety of other applications for internal combustion engines.

In the illustrated embodiment, the engine 23 is of the four-cylinder, inline type. It will also be readily apparent to those skilled in the art how the invention can be utilized with varying numbers of cylinders and cylinder placement. Where reference is made to inline engines here and in the claims, this is intended to encompass one bank of a V-type or opposed engine.

The engine 23 is comprised of a cylinder block 24 in which four aligned cylinder bores 25 are formed. Pistons 26 reciprocate in each of the cylinder bores 25. These pistons 26 are coupled to the small ends of connecting rods 27 by means of piston pins (not shown). The big ends of the connecting rods 27 are journaled on the throws 28 of a crankshaft 29.

The crankshaft 29 is rotatably journaled within a crankcase chamber formed by a skirt 31 of the cylinder block 25 and a crankcase member 32 that is affixed thereto. As is typical with motorcycle practice, this crankcase chamber may also include a change speed transmission for driving a final drive that drives the rear wheel of the motorcycle in a known manner.

Figure 2:
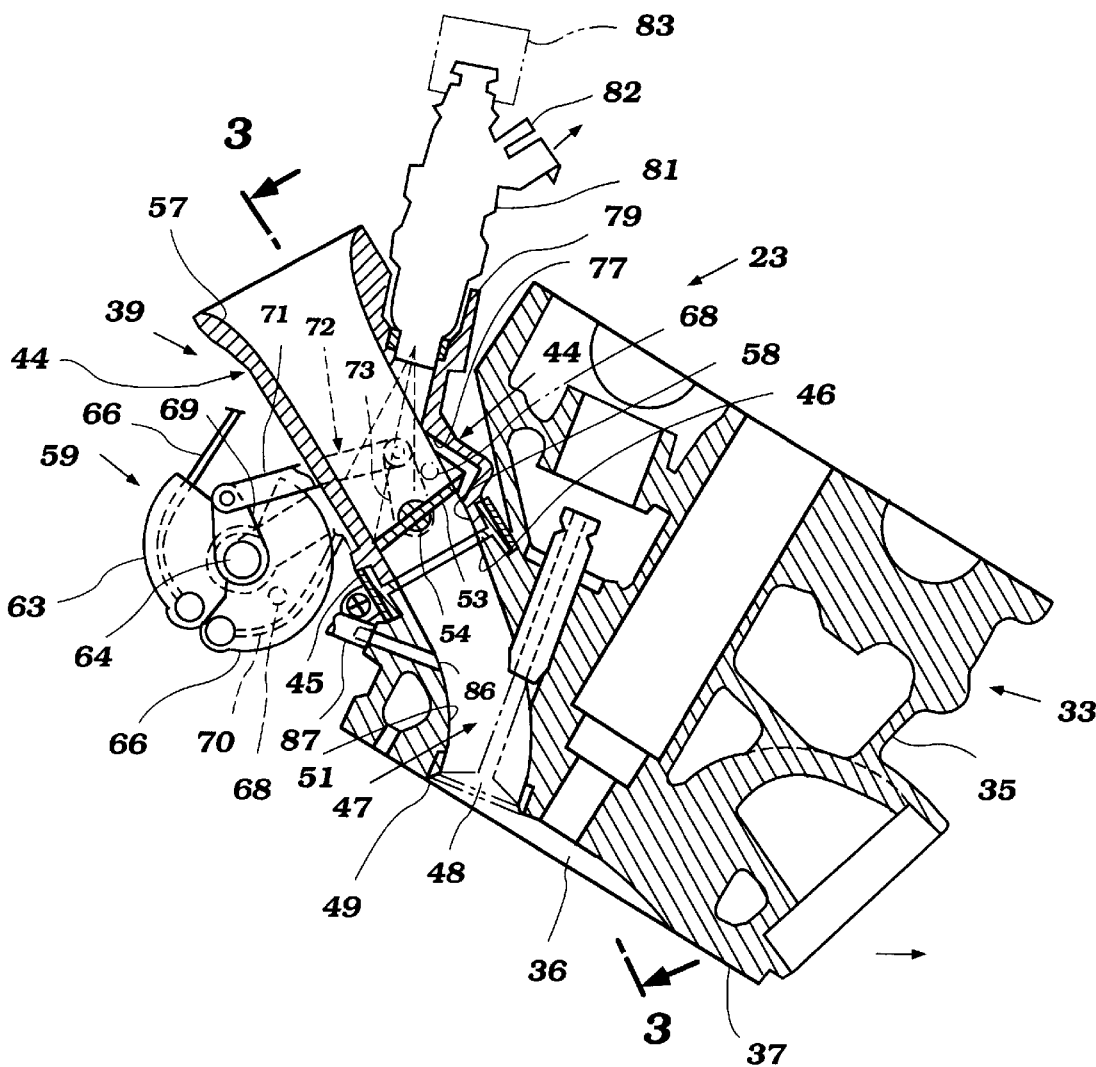
FIG. 2 is a cross-sectional view taken through the cylinder head looking in a direction opposite to that of FIG. 1.
Figure 3:
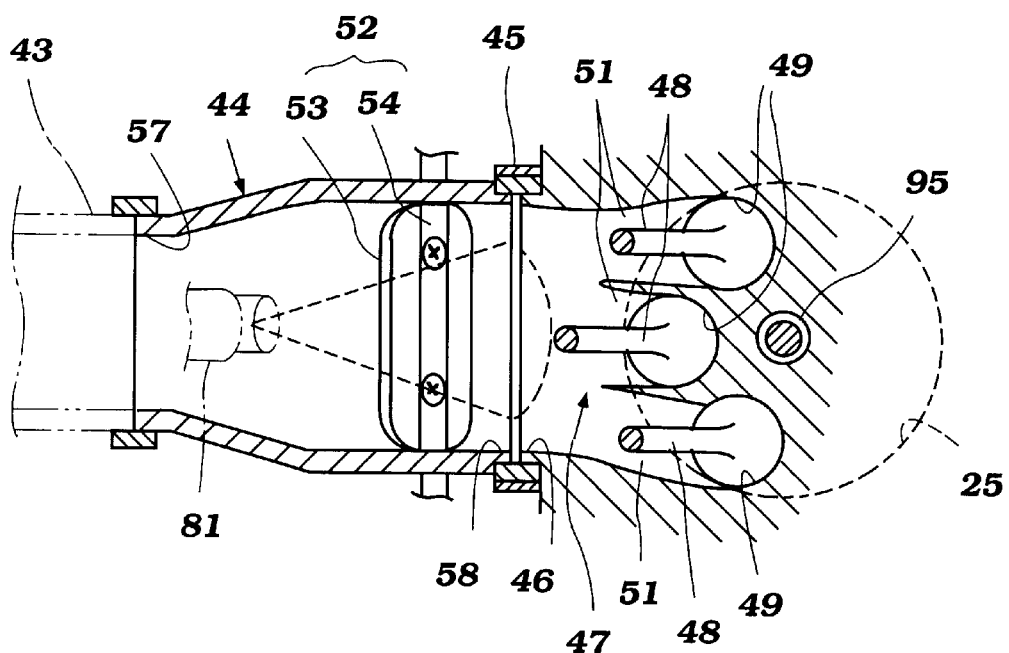
FIG. 3 is a cross-sectional view taken along the line 3—3 of FIG. 2.

A cylinder head assembly, indicated generally by the reference numeral 33, is affixed to the upper end of the cylinder block 24 in a known manner. As should be apparent from the drawings, the cylinder bores 26 of their cylinder block 24 have their central axes 34 inclined relative to a vertically extending plane so that the cylinder head assembly 33 is positioned above and slightly forwardly of the cylinder block 24. This provides a compact construction and also facilitates positioning of the induction system and other associated components, as will become apparent As best seen in FIGS. 2 and 3, the cylinder head assembly 33 is formed primarily by a main cylinder head casting 35. This casting 35 has individual recesses 36 formed in a lower face 37 thereof. This lower face 37 is held in sealing relationship with the cylinder block 24 in a known manner. The cylinder head recesses 36, cylinder bore 25, and heads of the pistons 26 form the combustion chambers of the engine. At top dead center, the combustion chamber recesses 36 forms a major portion of the clearance volume of this combustion chamber.

The total volume of the combustion chamber including the volume displaced by the piston 26 and the cylinder head recess 36 and the area in the cylinder bore 25 above the head of the piston 26 forms a total volume of the engine. The volume displaced by the reciprocation of the piston during a stroke is referred to as the "exhaust volume" of the engine and is only slightly less than the maximum clearance volume in order to maintain a high effective compression ratio.

An intake charge is delivered to the combustion chambers of the engine 23 through an induction system which is indicated generally by the reference numeral 38. This induction system includes an air inlet device 39 that is mounted on the main frame tube 22 forwardly of a fuel tank 41 and which is enclosed by body cowling member 42. The air flows through this air inlet device 39 into a plurality of intake trumpets 43 each of which serves a respective throttle body, indicated generally by the reference numeral 44 and in which a throttle valve arrangement is provided which will be described later.

This throttle body 44 is connected by a flexible coupling 45 to serve the individual inlet openings 46 of an intake passage arrangement, indicated generally by the reference numeral 47, that serves each combustion chamber. In the illustrated embodiment, the engine 23 is of the five valve per cylinder type and thus includes three intake valves 48 each of which valves a respective intake valve port or valve seat 49 formed in the cylinder head recess 36 in an arrangement best shown in FIG. 3. The intake passage 47 begins at the inlet opening 46 and branches into three portions 51 each of which serves a respective one of the intake valve ports 49.

The throttle valve arrangement provided in the throttle bodies 44 will now be described by primary reference to FIGS. 2, 3, 5, and 6. As seen best in FIGS. 1 and 2, the intake side of the cylinder head 35 is formed with a recess between its upper and lower edges. The throttle bodies 44 extend in part into this recess for a reason to be noted.

Each throttle body 44 journals a throttle valve assembly, indicated generally by the reference numeral 52. Each throttle valve assembly 52 is comprised of a throttle plate 53 of the butterfly type and a supporting throttle valve shaft 54. The throttle valve shafts 54 are rotatably journaled in the throttle bodies 44 in any known manner. These throttle valve shafts 54 are connected to each other by coupling mechanisms 55 that permit synchronization of the various throttle valves 52 in a manner known in the art.

It should be noted that each throttle body 52 forms an intake passage that is comprised of a generally round or cylindrical inlet end 57 and a generally oval-shaped outlet end 58. The throttle plates 53 have themselves a generally oval configuration. As may be best seen in FIG. 2, it should be noted that the axes of rotation of the throttle valve shafts 53 as disposed closely adjacent the cylinder head assembly 33 and specifically the main cylinder head member 35. This is done for a couple of reasons.

The first is to maintain a compact assembly and a short inlet tract. The other is to provide a specific volume Q for the intake passage portion that extends between the closed position of the throttle valve plates 53 and the intake ports 49 which has a relationship to the aforenoted exhaust gas volume. This ratio preferably falls within the range of 0.15 to 0.45 as noted in the aforenoted copending application Ser. No. 09/016,199, filed Jan. 30, 1989 and assigned to the assignee hereof.

In the closed or idle position of the throttle valves 52, the valve plates 55 extend generally parallel to the plane defined by the cylinder bore axes 34. They also lie in substantial part in the aforenoted cylinder head side recess.

Figure 6:
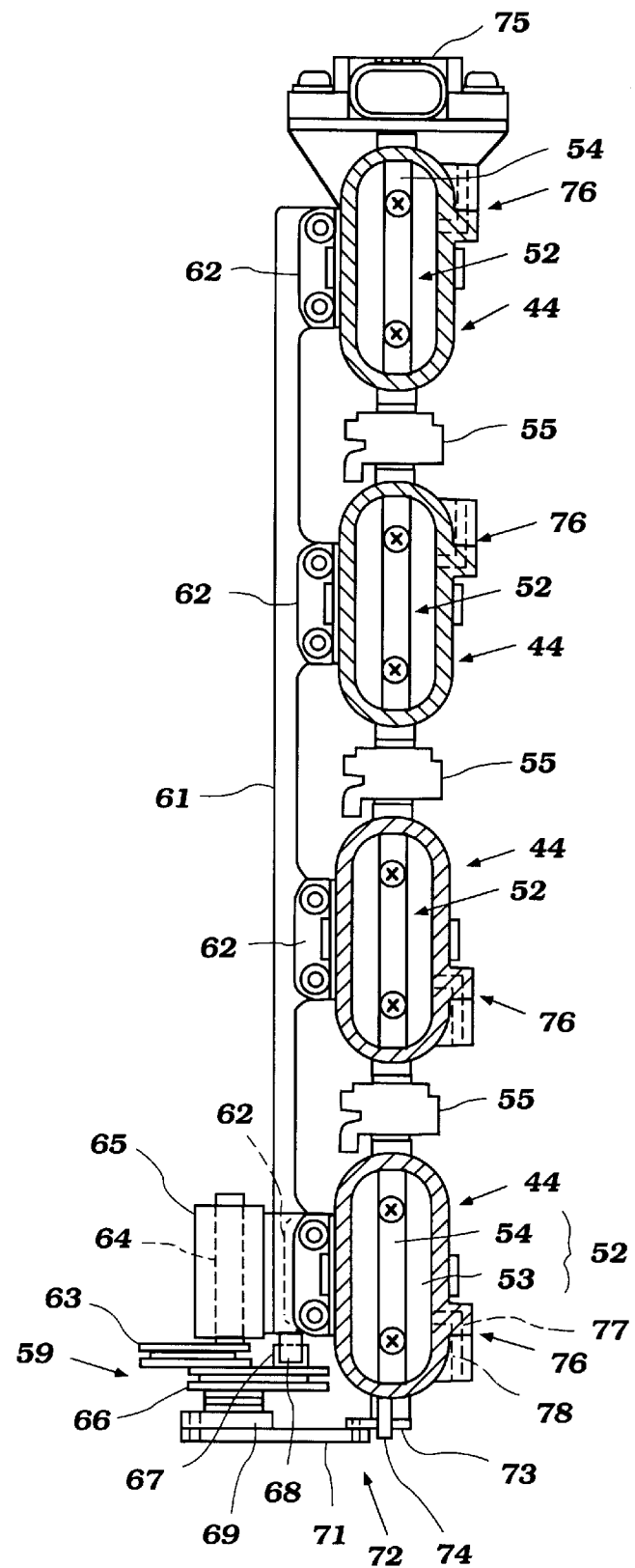
FIG. 6 is a cross-sectional view taken along the line 6—6 of FIG. 5 and shows the throttle linkage system.

In order to permit a very compact arrangement for the throttle valve mechanism and to permit the close position of the throttle valve shafts 54 to the side of the cylinder head assembly 33, a throttle valve actuating mechanism, indicated generally by the reference numeral 59 and shown in most detail in FIGS. 2 and 6 is provided. This throttle valve actuating mechanism provides several functions, as will be described, in addition to the mere actuation of the throttle valve assemblies 51 in synchronism.

There is provided a mounting assembly 61 that is connected to individual flanges 62 of each of the throttle bodies 44 so as to provide not only rigidity but also so as to ensure against lost motion or hysteresis in the throttle actuating mechanism. A first pulley segment 63 is affixed on a throttle valve actuating shaft 64 mounted in an enlarged boss 65 at one end of the mounting assembly 61. This pulley 63 is operated by a wire actuator 66 from the remote throttle actuator mechanism. A second pulley segment 66 receives the remaining wire actuator portion 70 and is adjustably connected to the pulley segment 63 so as to adjust the phase therebetween and also permit adjustment of a full throttle stop tab 67 which contacts a fixed stop 68 on the mounting assembly 61 so as to set the full throttle position for the throttle valve assemblies 52.

A short lever arm 69 is also affixed relative to the shaft 64 or pulley portion 66. This arm 69 has a pivotal connection to one end of a throttle actuating link 71 of the motion transmitting mechanism, indicated generally by the reference numeral 72 which transmits rotation to the throttle shafts 54. For this purpose, the throttle valve shaft 54 associated with the adjacent throttle valve assembly 52 has a lever arm 73 to which the other end of the link 71 is pivotally connected. An adjustable stop 74 carried by this throttle body 44 also functions to set the idle position for the throttle valve assemblies 52.

At the end of the throttle body assembly opposite from the throttle actuating mechanism 59, there is provided a throttle position sensor, indicated generally by the reference numeral 75. This throttle position sensor 75 provides a control signal indicative of throttle valve position and accordingly operator demand to a control mechanism which will be described later with reference to FIG. 7.

As may be seen in the figures, when the throttle valve assemblies 52 are in their closed or idle position, the valve plate 55 substantially obstructs and closes the throttle body induction passage portions 58. Thus, idle speed is controlled by employing an idle air bypass passage arrangement, which appears best in FIG. 5 but which also may be seen in FIG. 2 and which is identified generally by the reference numeral 76. These idle air bypass arrangements 76 are formed by protrusions in the throttle bodies 44 and in which an idle bypass air flow passage 77 is provided. Each idle bypass passage 77 has its effective area controlled by a needle valve which is not shown but which is threaded into a threaded receiving aperture 78 formed in the throttle bodies 44 and which intersects the idle bypass passages 77. By adjusting the position of this needle valve, the idle airflow can be controlled and, accordingly, the idle speed can be set.

Adjacent these idle bypass passage arrangements 76, the throttle bodies 44 are formed with further protrusions 79 that form openings in which the nozzle tips of fuel injectors 81 are inserted. The fuel injectors 81 are of the electrically solenoid operated type and have terminals 82 which are connected to an electrical power source and control unit, to be described in conjunction with FIG. 7, for controlling the timing and duration of fuel injection.

As may be seen in FIG. 2, the fuel injectors 81 are mounted in the throttle bodies 44 so as to spray in a downward direction toward the downstream end of the throttle valves 75 when these throttle valves are in their idle or closed position. In addition, when the throttle valves 55 are fully open, the fuel spray will also be on the valve plates 55. This helps to ensure that fuel will not be deposited in such an area where it will not experience airflow. Thus, any fuel deposited in the induction system will be swept by the airflow into the combustion chambers.

Fuel is delivered to the fuel injectors 81 from a fuel supply system that includes, among other things, a fuel rail 83 that is connected to the inlet ends of the injectors. Fuel is delivered to this fuel rail 83 by a pressure inlet conduit 84 which communicates with a fuel pressure regulator 85. The regulator 85 regulates the pressure of the fuel delivered to the injectors 81 to a desired pressure by dumping excess fuel back to the fuel supply system.

Figure 4:
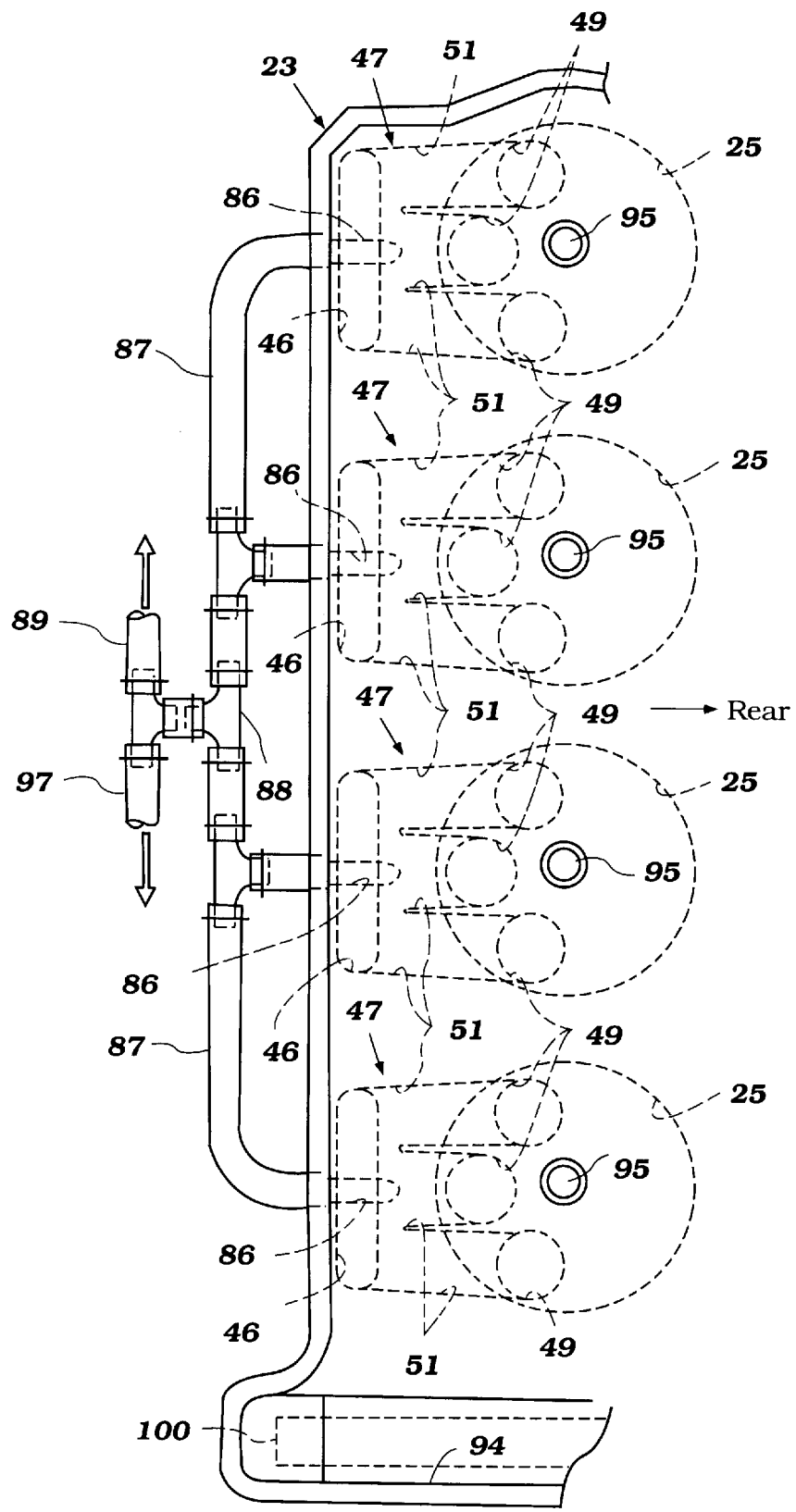
FIG. 4 is a view looking generally in the direction of FIG. 3 and shows the engine in phantom lines except for a peripheral edge of the cylinder head and also illustrating the a portion of the pressure control arrangement for the fuel injection system.
Figure 5:
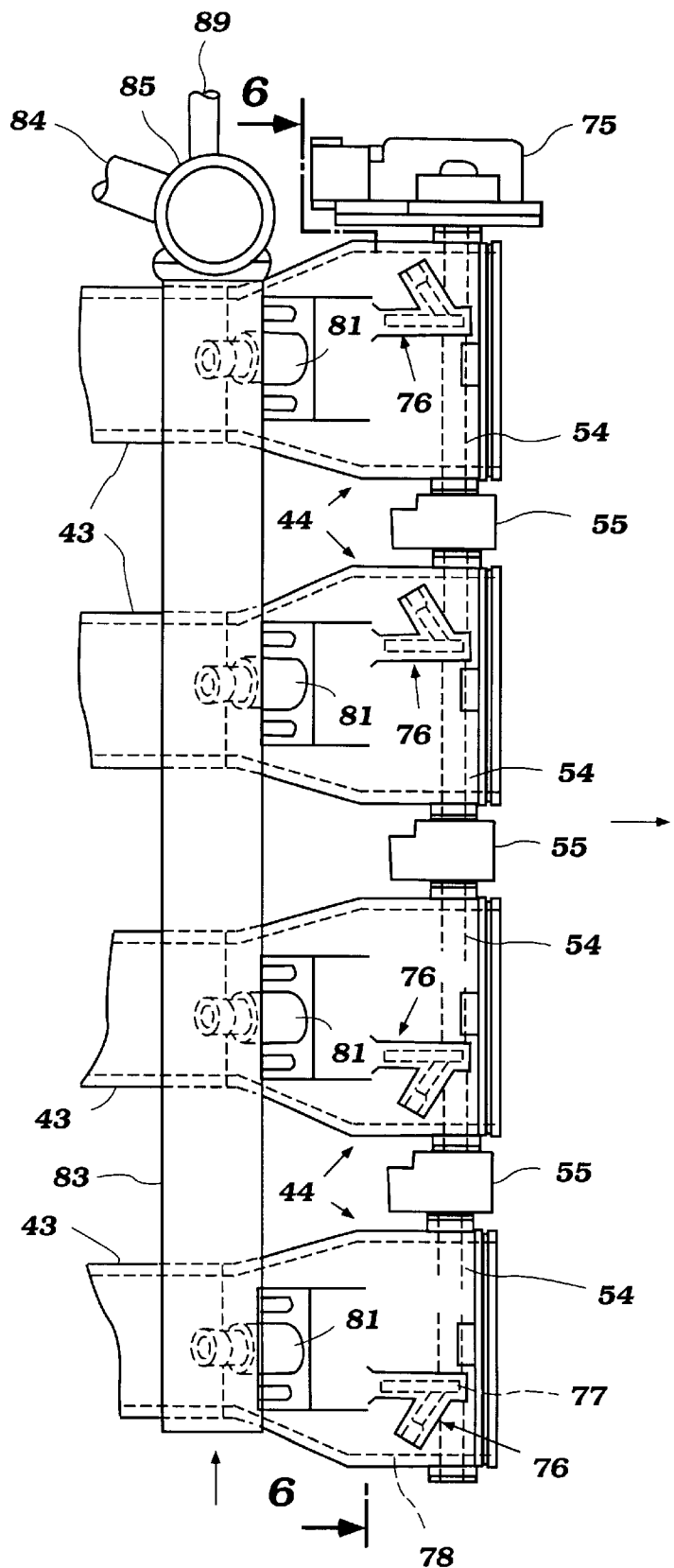
FIG. 5 is a view looking in the same direction as FIG. 4 but shows the induction system and fuel injection system.

In accordance with a feature of the invention, the regulated pressure is adjusted so as to be at a predetermined pressure above the pressure in the intake passage 47 of the cylinder heads and specifically the pressure downstream of the throttle valve 55. This is generally the area into which the fuel injector 81 injects. To accomplish this, a system shown best in FIGS. 2 and 4 is provided.

As may be seen in these figures, a pressure sensing passage 86 is formed in the cylinder head member 35 which intersects each of the intake passages 47 at a point slightly upstream of where they branch into the individual sections 51. A common flexible conduit 87 extends from these passages to a T section 88 which, in turn, has a branch 89 that extends to the pressure regulator 85 so as to provide the induction system vacuum or pressure signal to this regulator. Thus, the regulator can be set to maintain the desired predetermined pressure difference between the fuel injected by the injectors 81 and the area into which they inject. This permits the attainment of a more accurate fuel/air ratio, particularly under varying running conditions.

A further conduit 91 may extend from the T fitting 88 to an indicator gauge or to the control system for the engine which will again be described later by reference to FIG. 7.

Referring now primarily to FIG. 1, the intake valves 84 are operated by an intake camshaft 92 that is rotatably journaled within a cam chamber formed at the upper end of the cylinder head member 35 and which is closed by a cam cover 93 that completes the cylinder head assembly 33. This intake camshaft operates through thimble tappets for operating the intake valves 48 in a known manner. The intake camshaft 92 is driven by a flexible transmitter such as a timing chain 100 that is positioned within a chain case 94 (FIG. 4) formed at one end of the engine. This timing chain 100 actually will extend in somewhat overlapping position to the axis of the throttle valve shafts 54 and this is one reason why the use of the auxiliary throttle actuating shaft 64 is employed. As noted in the aforementioned, co-pending parent application, the cam shaft drive should preferably incorporate a variable valve timing mechanism for changing the valve overlap.

A spark plug 95 is mounted in the cylinder head assembly 33 with its spark gap at the center of each of the combustion chambers and substantially coaxial with the axis of the cylinder bores 25. The spark plugs 95 are fired by an ignition system, which will also be described shortly by reference to FIG. 7.

A pair of exhaust ports 96 are formed in the cylinder head member 35 on the side of the cylinder bore opposite to the intake port 49. There are two ports which coupled with the three intake ports gives the five valve per cylinder arrangement. Exhaust valves 96 operated by an exhaust camshaft 98 control the opening and closing of the exhaust port 96. Like the intake camshaft 92, the exhaust camshaft 98 is driven in timed relationship to the crankshaft 29 either through the same flexible transmitter such as the chain 100 or a different type of flexible transmitter arrangement.

The exhaust ports 96 communicate with an exhaust system which includes an exhaust manifold, shown in phantom and identified generally by the reference numeral 99 so as to control the discharge of the exhaust gases to the atmosphere and for silencing and, if desired, catalytic treatment of the exhaust gases.

The control system for controlling the firing of the spark plug 95 and the initiation and duration of fuel from the fuel injector 81 will now be described by reference to FIG. 7. As has been previously noted, this figure is a schematic block diagram of the various control components certain of which have already been described.

The main control system includes an ECU 101 that includes a CPU that processes the information received from certain sensors and control the operation of the ignition system to fire the spark plug 95 and the solenoid signals transmitted to the fuel injector 81 through its terminals 82. The ECU and CPU receive input information from the throttle position sensor 75 and also from the intake manifold pressure signal 91 transmitted from the pickup points 86 in the induction system downstream of the throttle valve assemblies 52.

In addition, there is a crank angle sensor 102 that is associated with the crankshaft 29 and provides a signal indicative of crankshaft position.

Also, associated with the crankshaft 29, or with one of the camshafts 92 or 98, there is provided a cylinder indicator sensor 103 that discriminates which cylinder is at its top dead center position.

A fuel pressure sensor 104 is related with the fuel pressure regulator 85 and outputs a signal indicative of the fuel pressure. As has been previously noted, fuel pressure is varied in response to intake manifold pressure so as to maintain a substantially constant pressure difference.

Engine temperature is sensed by an engine temperature sensor 105.

Also, in accordance with the control routine, which can be of any conventional or known type, the timing of firing of the ignition system and timing and duration of injection of fuel are controlled with a specific control strategy. This is based upon the input from noted parameters and any other engine or ambient or vehicle conditions. Also, the system is operated so as to provide compensation in both fuel injection amount and duration and spark timing in response to transient operational periods. In accordance with the control strategy, those transient operational adjustments also vary depending upon whether the engine 23 is driving a load, i.e., the wheel of the motorcycle, or is in a neutral condition.

Therefore, there is provided a neutral detector switch 106 that is interrelated with the changed speed transmission of the vehicle and which outputs a signal that indicates when the transmission is in neutral. The transient condition adjustment during this condition, which is deemed a non-load condition, is made different from that when operating under load conditions. This is because transient conditions vary less significantly under neutral condition than when operating under load.

In the embodiment as thus far described, the fuel injector 81 has been disposed in the area between the intake trumpet 43 and the cylinder head assembly 23. Specifically, the fuel injectors 81 are nested between the cam cover 83 and the trumpet 43. FIG. 1 also shows an alternative arrangement wherein the throttle bodies 44 are provided with a protuberance on the side thereof which faces away from the cylinder head. This permits the injectors 82 to be mounted in a rearwardly extending position as shown in phantom at 82a. In this instance, the fuel rail 83 is relocated as shown in phantom at 83a in this figure.

Figure 8:
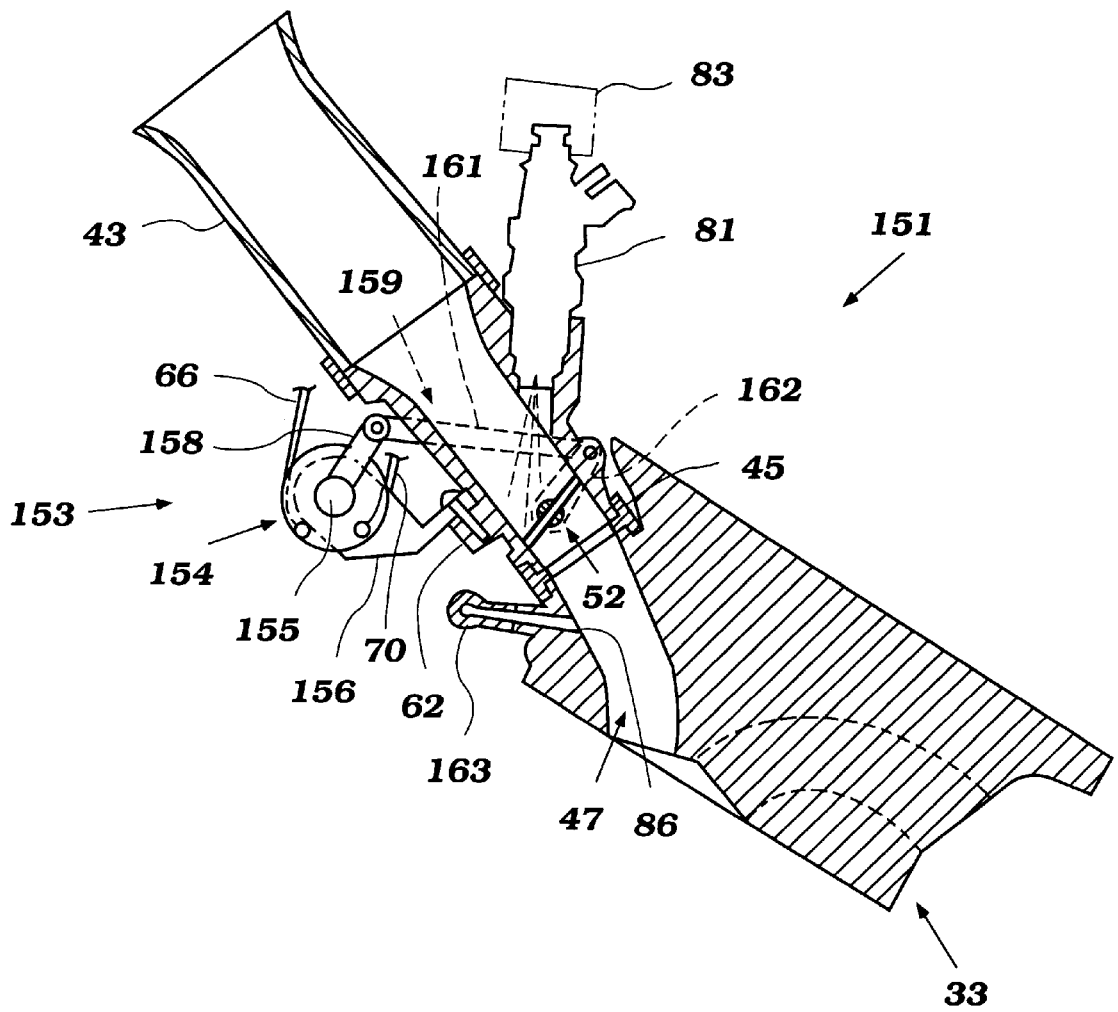
FIG. 8 is a cross-sectional view, in part similar to FIG. 2, and shows another embodiment of the invention.
Figure 9:
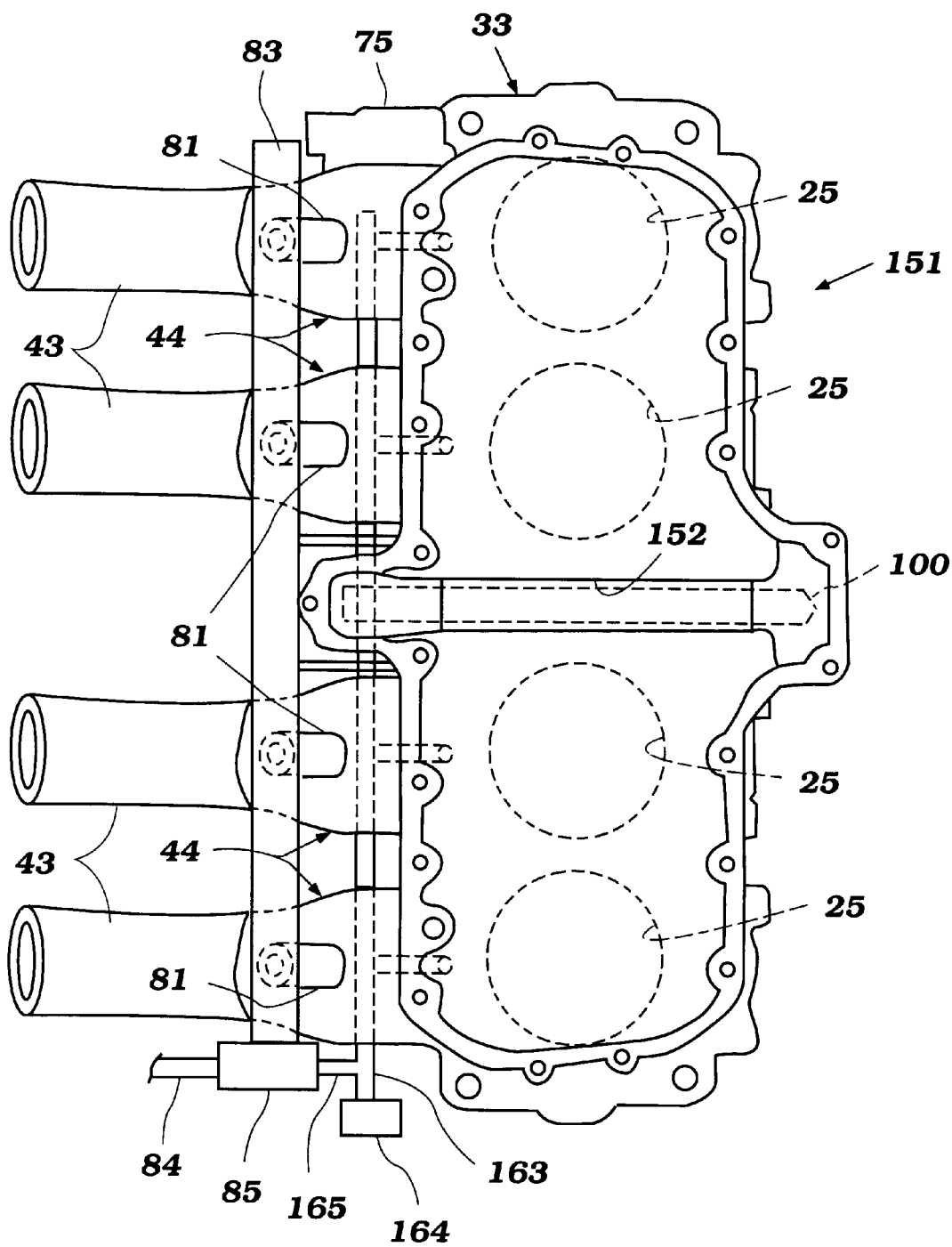
FIG. 9 is a view, in part similar to FIG. 5 but shows the fuel supply and induction system for this embodiment of the invention.
Figure 10:
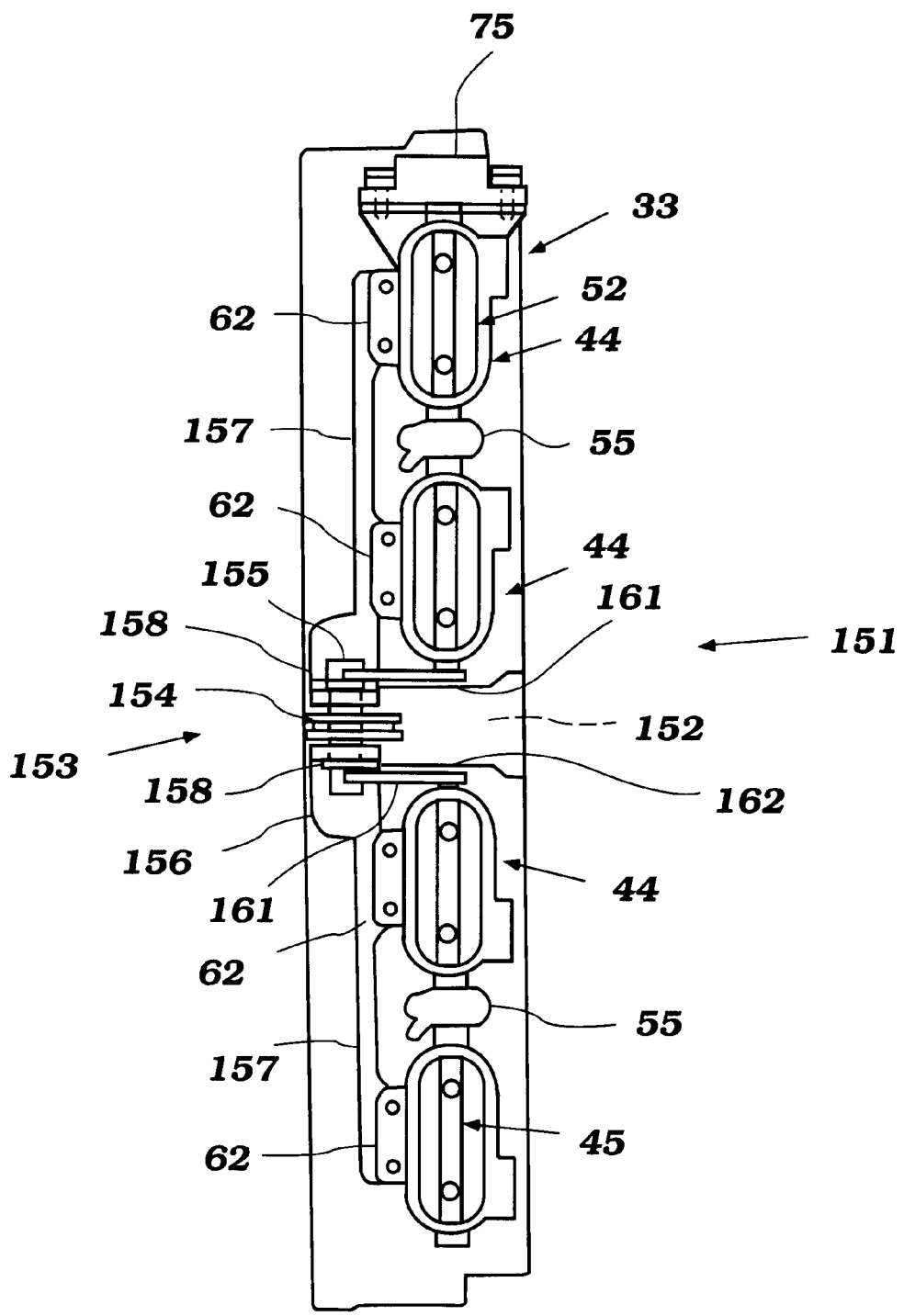
FIG. 10 is a cross-sectional view, in part similar to FIG. 6 but shows the throttle valve arrangement for this embodiment.

An engine constructed in accordance with another embodiment of the invention is shown in FIGS. 8–10 and is identified generally by the reference numeral 151. The engine 151 of this embodiment differs from the previously described embodiment in several regards all dealing with the throttle control arrangement, throttle position sensor and fuel pressure regulation system. For that reason, only three views a believed to be necessary to illustrate this embodiment and where components are the same or substantially the same as the previously described embodiment, they have been identified by the same reference numeral. Any components that are not illustrated may be assumed to be the same. Also, many of these common components will not be described again, except insofar as is necessary to understand the construction and operation of this embodiment.

In this embodiment, the cylinder head assembly, still indicated by the reference numeral 33, has a slightly different camshaft drive arrangement than the embodiment previously described. In that embodiment, the timing chain case 94 was formed at one end of the engine. In this embodiment, however, the timing chain case, indicated generally by the reference numeral 152 is positioned between the centermost two cylinder bores 25. Thus, the intake and exhaust camshafts which are not shown in this figure are driven centrally of the crankshaft.

As a result of this, the throttle body assemblies 44 are paired and the paired throttle bodies have their throttle valve shafts 54 connected by means of the couplings 55. A throttle valve linkage operating system, indicated generally by the reference numeral 153 is disposed between the throttle bodies 44 of the number 2 and number 3 cylinders and generally in the area below the portion of the chain case 152 formed in the cylinder head and cam cover.

The throttle control mechanism 153 in this embodiment includes a single centrally positioned pulley sheave 154 that is connected to the wire transmitters 66 and 70. This sheave 154 is mounted on a throttle valve actuating shaft 155 which is, in turn, mounted on a mounting assembly 156. This mounting assembly 156 has outwardly extending portions 157 which are mounted to the aforenoted throttle body flanges or bosses 62.

On opposite sides of the sheave 154, and fixed for rotation with it are a pair of throttle actuating levers 158. Each lever 158 is connected to a motion transmitting mechanism, indicated generally by the reference numeral 159. This mechanism includes primarily a link 161 that is pivotally connected to the throttle actuating arm 158. The other end of each link 162 is pivotally connected to a throttle lever 162 which is affixed to the throttle valve shaft 54 of the associated adjacent throttle valve assembly 52.

In this embodiment like the previously described embodiment, a throttle position sensor 75 is affixed to the throttle valve shaft 54 of the throttle body 52 formed at one end of the engine.

In this embodiment, like the previously described embodiment, the pressure of the fuel supplied to the fuel rail 83 for the fuel injectors 81 is regulated so as to maintain a predetermined pressure difference between the injection pressure and the induction system pressure in the area where the fuel is injected. Thus, like the previously described embodiment, a pressure sensing port 86 is formed in the cylinder head assembly 33 and communicates with the intake passages 47 downstream of the throttle valve assemblies 52.

Figure 7:
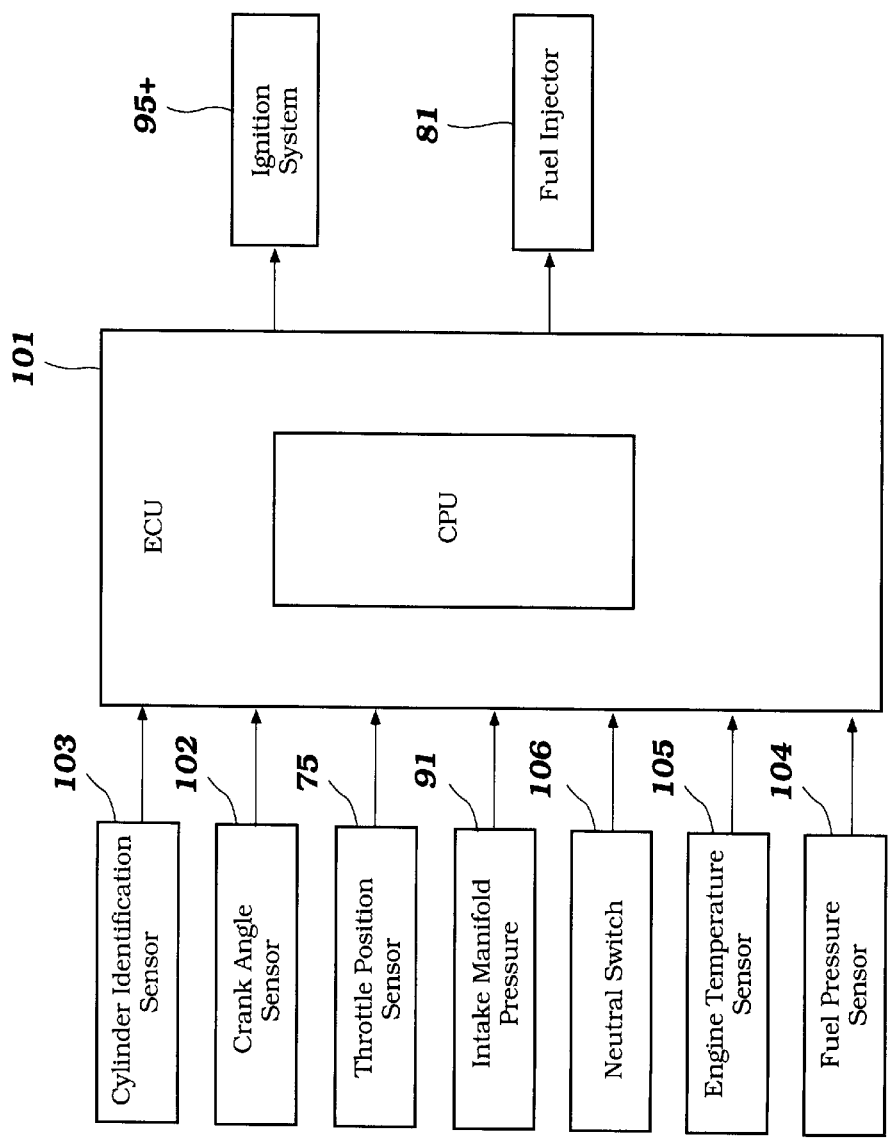
FIG. 7 is a block diagram showing the elements of the control system for the fuel injection system and the ignition system.

A pressure manifold, indicated generally by the reference numeral 163 is affixed to the side of the cylinder head and communicates these pressure ports 86 with first a pressure sensor device 164 which can be in essence the same as the intake manifold pressure sensor shown at 91 in FIG. 7.

In addition, there is provided a branch connection 165 that connects to the fuel pressure regulator 85 for regulating the fuel pressure delivered to the fuel rail 83 and, accordingly, the fuel injectors 81.

It should be noted that, although the same reference numerals are applied to the throttle position sensor 75 and the fuel pressure regulator 85, in this embodiment, they are at opposite ends of the engine 151 wherein in the previous amendment they were located at the same end of the engine 23. This difference is partially a result of the different positioning of the timing chain cases 94 and 152. In the previous embodiment, this timing chain case 94 was at one end of the engine and the throttle position sensor 75 and fuel pressure regulator 85 were positioned at the opposite end of the engine. In the embodiment of FIGS. 8–10, because of the central positioning of the timing chain case 152, these devices can be located at opposite ends of the engine to maintain a more compact and serviceable construction.

As has been previously noted, the engine performance can be significantly improved by utilizing the proper ratio of the volume of the intake passage downstream of the throttle valve in relation to the exhaust gas volume of the combustion chamber. Basically, the embodiments previously described have provided in essence a fixed volume. It is possible, however, to vary the volume also and the copending application Ser. No. 09/016,199, filed Jan. 30, 1998 describes several such embodiments.

Figure 11:
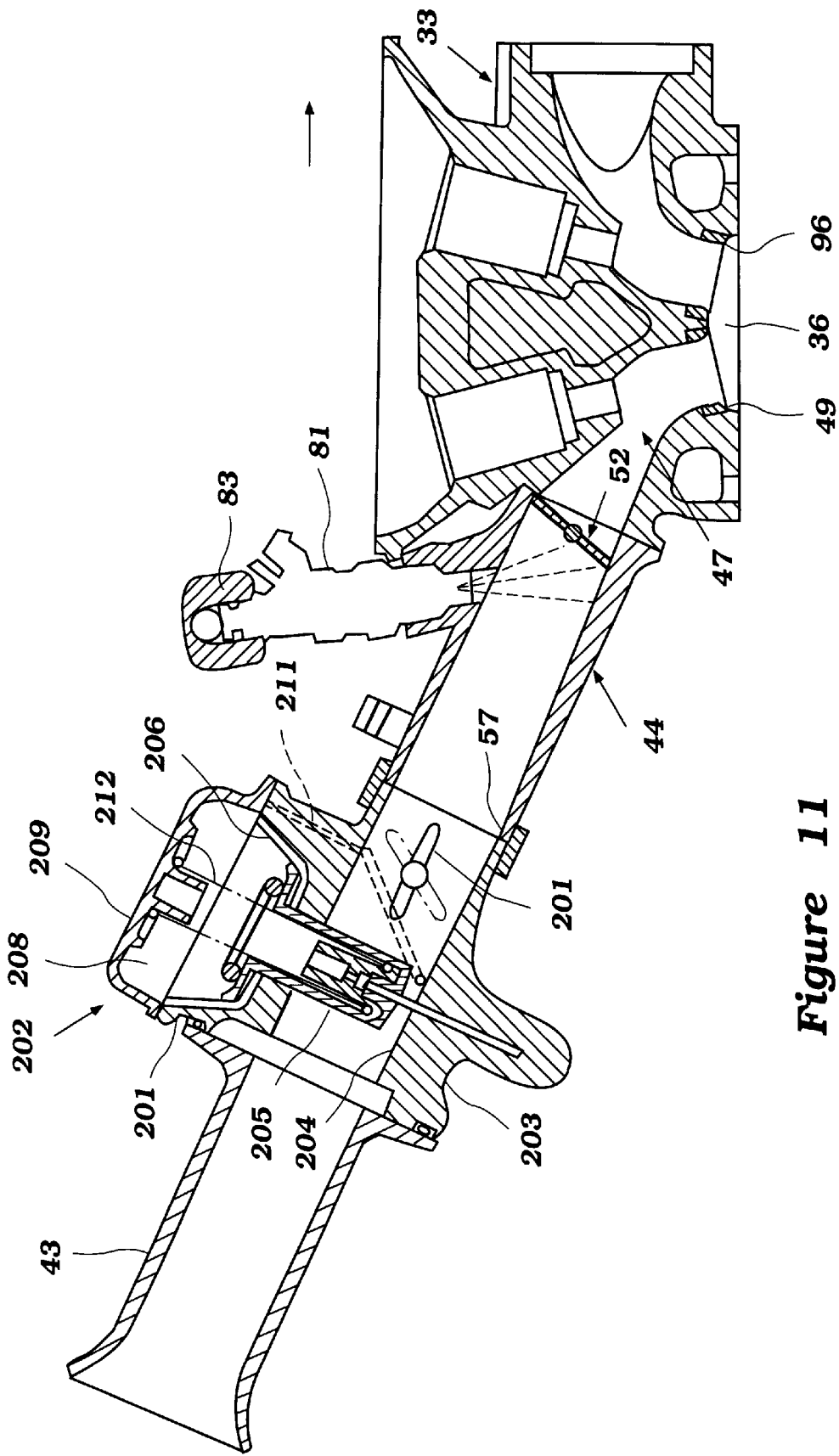
FIG. 11 is a cross-sectional view, in part similar to FIGS. 2 and 8 and shows yet another embodiment of this invention.
Figure 12:
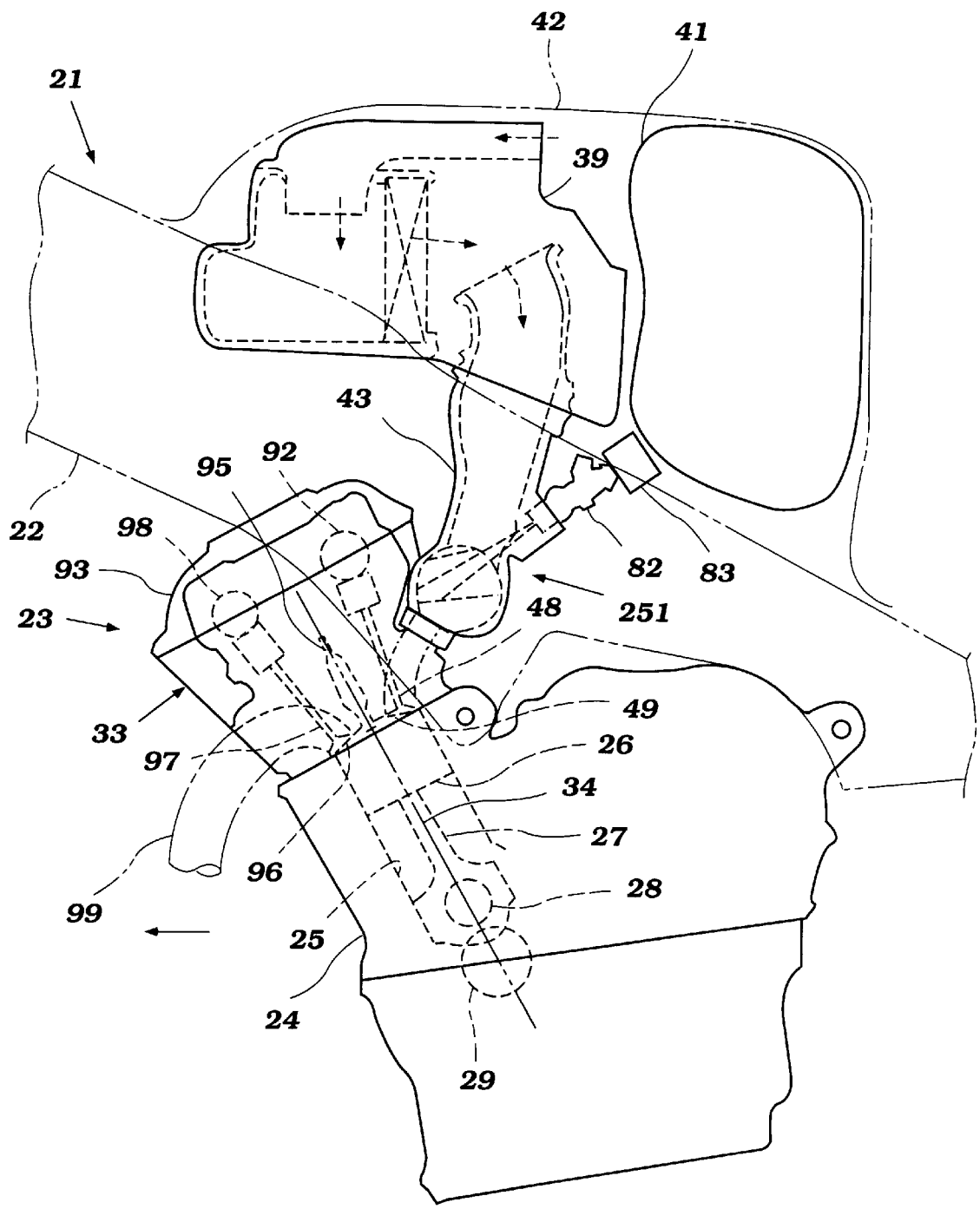
FIG. 12 is a view in part similar to FIG. 1 and shows yet another embodiment of the invention.

An additional embodiment that can achieve this variation in effective volume and which can be utilized with the constructions disclosed herein is illustrated in FIG. 11. Since this embodiment is basically the same as the previously described embodiments, except for this variable volume feature, components which are the same have been identified by the same reference numeral. Also, for this reason, a number of the engine components are not illustrated and reference may be had to the foregoing descriptions for such components.

FIG. 11 is a view in part similar to FIG. 2 and, as just mentioned, those components of this embodiment which are the same as the previously described embodiment have been identified by the same reference numerals. Basically, the throttle body 44 and the throttle valve assembly 52 is of the type which has been previously described. However, in this embodiment, this valve assembly 52 serves an additional function to throttling. In this embodiment, the valve 52 acts to change the effective volume of the intake passage.

Thus, a main throttle valve 201 of the butterfly type is contained within a throttle controlling member, indicated generally by the reference numeral 202. This throttle controlling member 202 is interposed between the throttle body 44 and the trumpet 43.

The throttle controlling member 202 includes a throttle body 203 that forms an induction passage 204 that is complementary in configuration to the downstream side of the induction passage of the trumpet 43 and the upstream side 57 of the throttle body 44. The throttle valve 201 is of the butterfly type and since it is more removed from the cylinder head assembly 33 than that of the throttle valve assembly 52, it is not necessary to utilize a throttle valve actuating shaft. Rather, the throttle valve 201 may be operated directly in a conventional manner.

In this embodiment, the throttle valve assembly 52 primarily acts as a control valve and it will be described by this nomenclature as the description proceeds.

Upstream of the throttle valve 201 and within the induction passage 204 of the throttle assembly 202 there is provided a sliding piston type of throttle control valve 205. This sliding piston throttle control valve 205 is connected at its upper end to a flexible diaphragm 206. This diaphragm 206 is positioned within a chamber that is divided by the diaphragm 206 into an atmospheric air pressure chamber 207 and an induction system pressure control chamber 208.

The chamber 207 is vented appropriately to the atmosphere while the chamber 208, which is formed in primary part by a cover plate 209 that holds the diaphragm 206 in place is connected to a passage 211. The passage 211 communicates with the induction passage 204 downstream of the sliding piston throttle valve 205.

A coil compression spring 212 normally biases the sliding piston 205 to the position shown in FIG. 11 which is the normal idle/no load position. As the pressure in the intake passage 204 downstream of the sliding piston 205 decreases due to opening of the manually operated throttle valve 201, the atmospheric air acting in the chamber 207 on the underside of the diaphragm 206 will cause it to move upwardly so as to maintain a substantially constant pressure drop across the sliding piston 205.

In this embodiment, the control valve 52 is operated by a servomotor that is responsive to engine running conditions so as to effectively change the intake passage volume from the volume downstream of the control valve 52 to the volume downstream of the throttle valve 201. Thus, it is possible to provide a substantially greater volume under running conditions such as high speed/high load conditions which will improve the ratio of performance and engine combustion in the manner described in the copending application Ser. No. 09/016,199, filed Jan. 30, 1998.

In all of the embodiments as thus far described, the throttle valve contained within the throttle body 44 has been a butterfly type throttle valve. Other types of throttle valves can be employed in conjunction with the invention. FIGS. 12–16 show another such embodiment and which is generally the same as the embodiment of FIGS. 1–7, except for this difference. Also, in this embodiment, the fuel injector and fuel rail is positioned in the alternative location shown in phantom in FIG. 1. Because of these similarities, components of this embodiment which are the same or substantially the same as the embodiments previously described have been identified by the same reference numerals and will be described again only insofar as is necessary to understand the construction and operation of this embodiment.

In this embodiment, the throttle control valve assembly is indicated generally by the reference numeral 251. Like the throttle control assemblies previously described, the throttle control valve assembly 251 includes an outer housing assembly 252 that has an inlet opening 253 that is complementary to the discharge end of the inlet trumpet 43. In addition, it is formed with an outlet end 254 which is complementary to the inlet opening 46 of each cylinder head intake passage 47.

Intermediate these inlet and outlet openings 253 and 254, the housing 251 is formed with an enlarged cylindrical portion which defines a generally cylindrical opening 255 in which a throttle and control valve, indicated generally by the reference 256 is rotatably journaled. This control valve 256 has a generally cylindrical outer configuration 257 which is complementary to the bore 253. The control valve element 256 is supported for rotation about an axis indicated at 264 and which is offset slightly to one side of the flow passage of the housing 252.

This cylindrical section is formed with a through passageway 258 which defines a pair of side portions 259 and 261. These portions define an inlet opening 262 at one end and an outlet opening 263 at the other end. It should be noted that the configuration is such that the inlet end 262 is wider than the outlet end 263.

Figure 13:
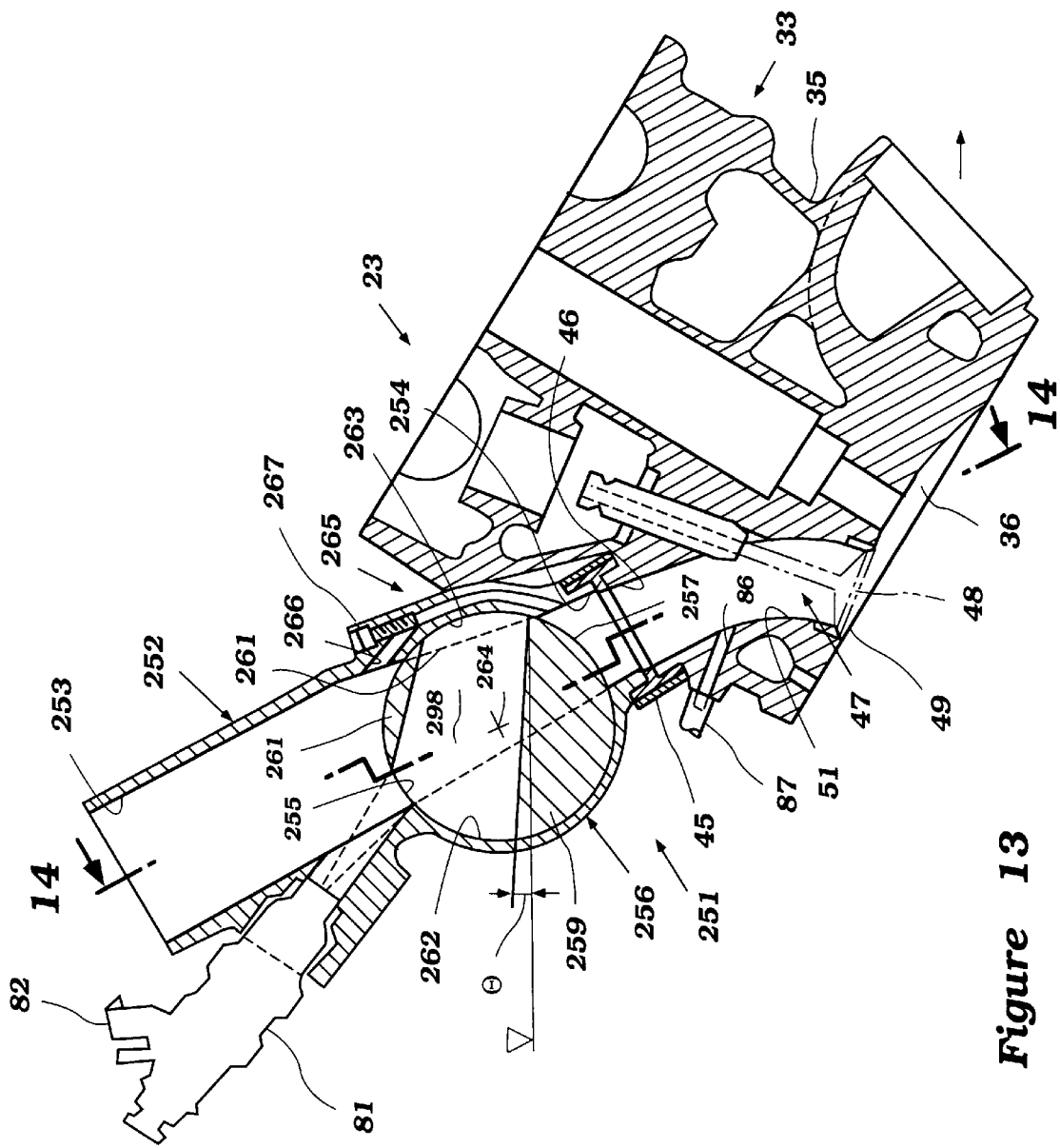
FIG. 13 is an enlarged cross-sectional view, in part similar to FIGS. 2, 8, and 11 for the embodiment of FIG. 12.
Figure 14:
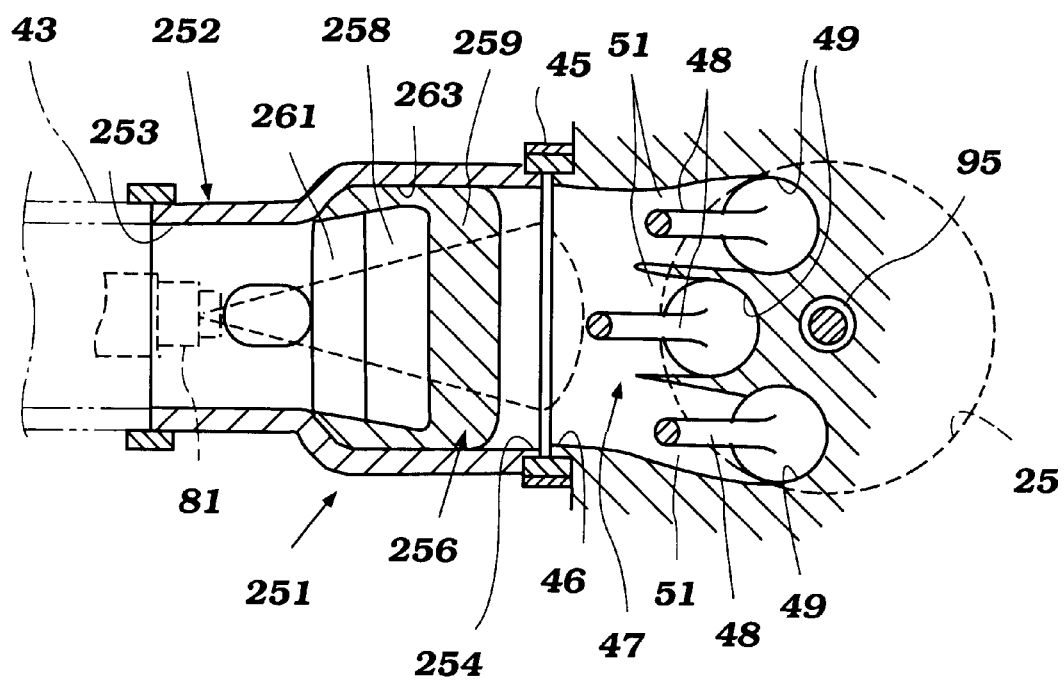
FIG. 14 is a cross-sectional view taken along the line 14—14 of FIG. 13.
Figure 15:
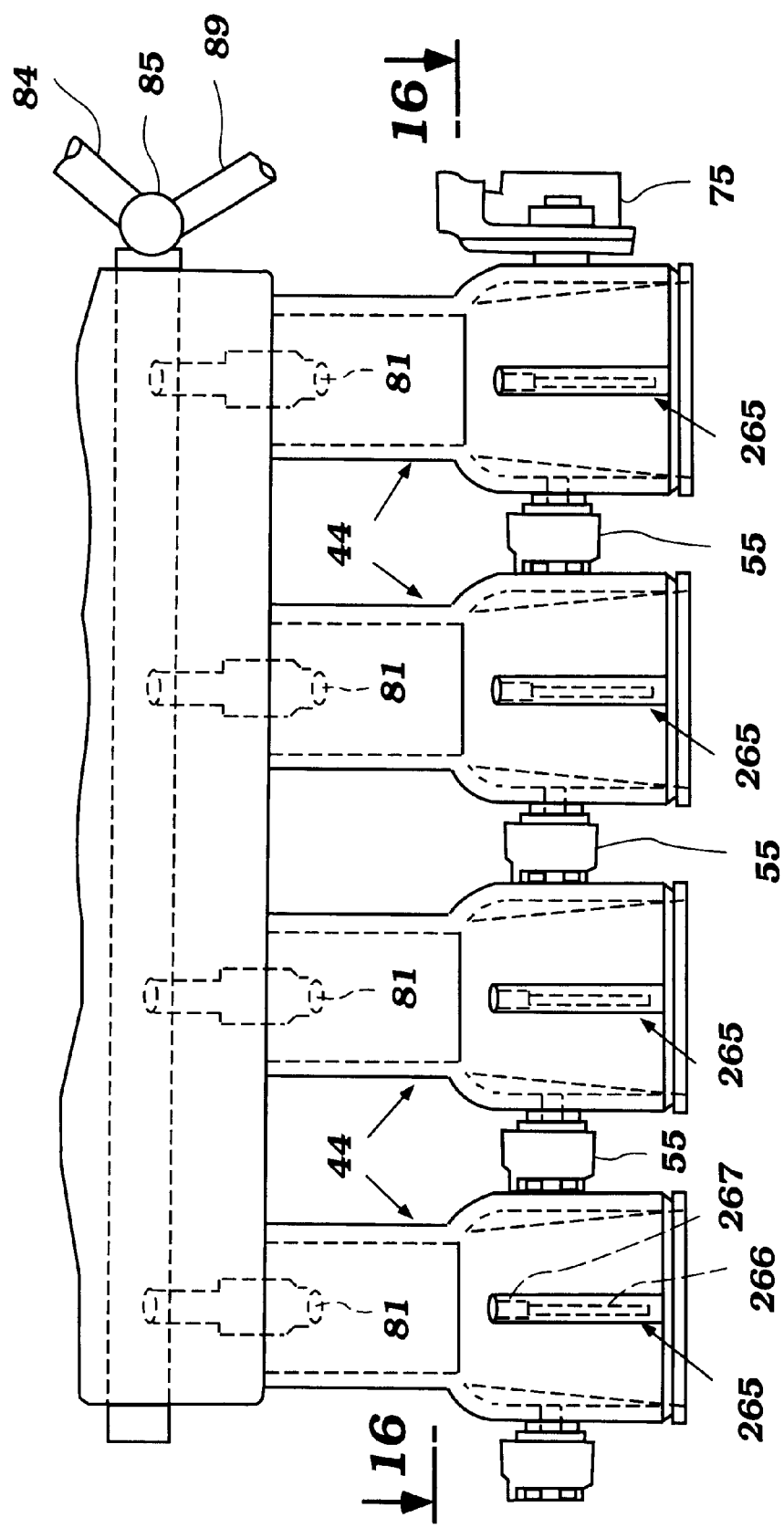
FIG. 15 is a top plan view showing the induction system of this embodiment.
Figure 16:
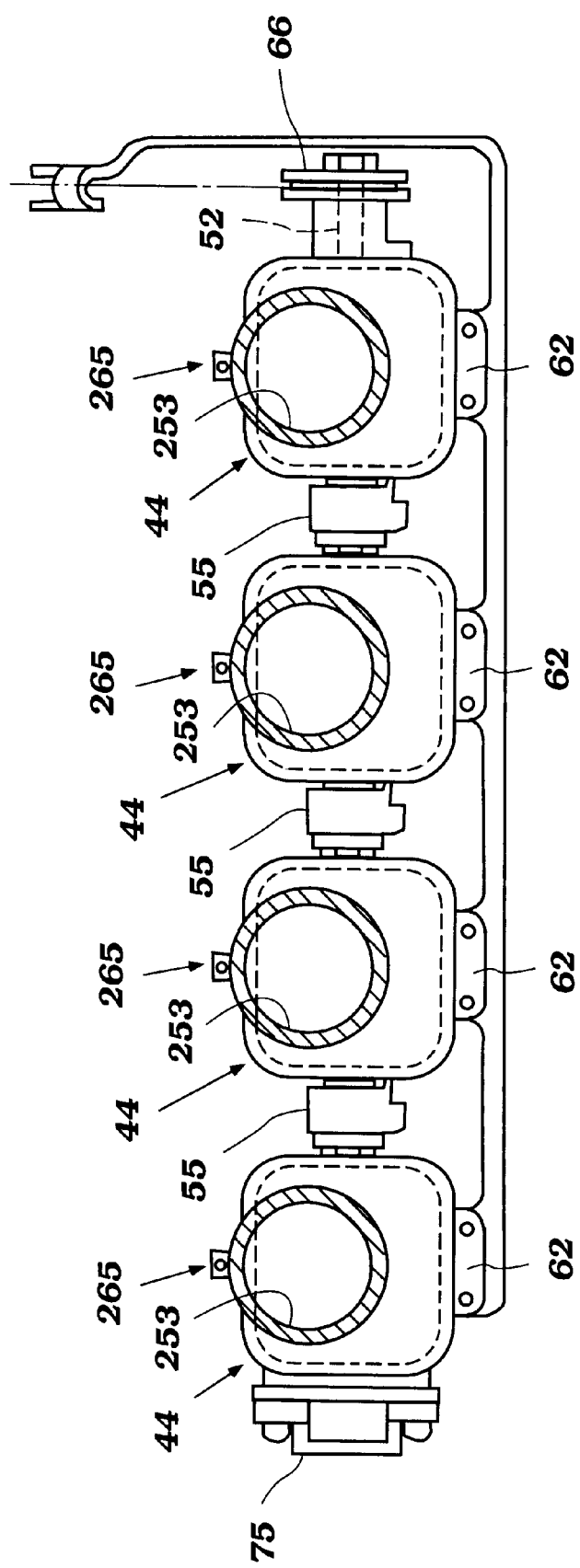
FIG. 16 is a cross-sectional view taken along the line 16—16 of FIG. 15.

As may be seen in FIGS. 13 and 14, under the idle condition, the control or throttle valve 259 is in its fully closed position and the outlet opening 263 of the passage 258 is blocked by the housing 252. Thus, an idle air passage arrangement indicated generally by the reference numeral 265 is provided. This is comprised of a bypass passage 266 that extends around the periphery of the housing recess 263 in which the valve element 256 is positioned. An adjusting screw 267 is threaded into the housing and is adjustable to vary the effective flow area of the passage 266 and, accordingly, the idle speed.

It should be noted that in this position the injector flow pattern is such that it will strike the valve body 261 and be deflected toward the passage 266. Some of the fuel may deposit on the valve in the passage 258 but this fuel will be dispersed as the throttle valve 256 is opened.

During initial opening, there will be a tumble flow into the combustion chamber due to the fact that the surface of the portion 259 directs the flow toward the side of the intake ports 49 closer to the cylinder bore axis. As the throttle valve 256 is progressively opened, this tumble action will decrease but the fuel will still be sprayed into the induction passage formed as shown by the dotted line position in FIG. 13. Some of this fuel will also be deposited on the sides 259 and 261 of the valve element even when fully opened to improve acceleration as aforenoted.

Thus, it is believed that the described embodiments of the invention are very effective in providing the desired volumetric relationship between the intake passage and the exhaust bottom and thus good combustion control. Also, the construction provides a very compact arrangement that will ensure that the components can be easily operated in a very small area without interference and while facilitating connection to the associated controls.

Of course, the foregoing description is that of preferred embodiments of the invention and various changes and modifications may be made without departing from the spirit and scope of the invention, as defined by the appended claims.

What is claimed is:

1. An internal combustion engine comprising a combustion chamber formed by a cylinder bore closed at one end by a cylinder head and by a piston reciprocating in said cylinder bore, at least one intake passage serving said combustion chamber through an intake port valved by an intake valve, a throttle valve in said intake passage upstream of said intake port moveable between an opened, full throttle position and a closed, idle position for controlling the flow through said intake passage into said combustion chamber, the area between said throttle valve and said intake valve being devoid of other flow control valves, at least one exhaust passage serving said combustion chamber through an exhaust port, an exhaust valve for controlling the flow through said exhaust port, valve actuating means for operating said intake valve and said exhaust valve between their open and closed positions, the ratio between the volumes of the portion of said intake passage between said throttle valve and said intake port and the maximum volume of said combustion chamber when said piston is at bottom dead center position being set to a predetermined ratio, said throttle valve being moveably supported within a throttle body separate from but attached to said cylinder head, said throttle valve being disposed inwardly of a plane parallel to said cylinder bore axis and containing the outer peripheral edge of the intake passage side of said cylinder head when said throttle valve is in said closed, idle position.

2. An internal combustion engine as set forth in claim 1, wherein the volume ratio is in the range of 0.15 to 0.45.

3. An internal combustion engine as set forth in claim 1, wherein the intake passage side of the cylinder head is formed with a recessed area between a lower face thereof that faces a cylinder block in which the cylinder bore is formed and an upper surface that forms a chamber that contains the valve actuating means and which chamber is closed by a cam cover affixed to said cylinder head, the throttle valve being disposed at least in part in said recessed area when said throttle valve is in one of its open and closed positions.

4. An internal combustion engine as set forth in claim 3, wherein the one throttle valve position is the closed position.

5. An internal combustion engine as set forth in claim 3, wherein the throttle body is fixed to the cylinder head in the recessed area of said cylinder head.

6. An internal combustion engine as set forth in claim 1, wherein the throttle valve is fully closed to substantially obstruct the intake passage in its closed, idle position.

7. An internal combustion engine as set forth in claim 6, wherein the throttle valve is a butterfly type valve having a valve plate fixed to a throttle valve shaft journaled in the throttle body.

8. An internal combustion engine as set forth in claim 6, wherein the throttle valve comprises a cylindrical body journaled for rotation in a cylindrical bore in the throttle body and forming a flow area the effective size of which varies upon rotation of said cylindrical body in said throttle body.

9. An internal combustion engine as set forth in claim 1, wherein there is provided a second throttle valve for controlling the flow through the intake passage upstream of the throttle valve recited in claim 1 and which throttle valve is effective to vary the intake passage volume.

10. An internal combustion engine as set forth in claim 9, wherein there is provided a third throttle valve in said intake passage upstream of the second throttle valve positioned automatically to provide a substantially constant pressure drop thereacross.

11. An internal combustion engine as set forth in claim 1, wherein throttle valve is journaled on a throttle valve shaft journaled in the intake passage closely adjacent one side of the cylinder head and further including a throttle valve actuating shaft journaled for rotation about a throttle valve actuating shaft axis disposed parallel to the axis of said throttle valve shaft and at the side of said intake passage outwardly from said cylinder head and motion transmitting means for transmitting rotation of said throttle valve actuating shaft into rotation of said throttle valve shaft.

12. An internal combustion engine as set forth in claim 11, wherein the motion transmitting means comprises a linkage system.

13. An internal combustion engine as set forth in claim 12, wherein the linkage system comprises first and second levers affixed for rotation with the throttle valve shaft and the throttle valve actuating shaft, respectively, and a link pivotally connected to each of said first and second levers.

14. An internal combustion engine as set forth in claim 11, wherein said engine has a plurality of in line cylinder bores each defining a respective combustion chamber formed and served as defined in claim 11, the intake passage serving each of said combustion chambers having a respective throttle valve and throttle valve shaft, the throttle valve actuating shaft operating all of said throttle valve shafts.

15. An internal combustion engine as set forth in claim 14, wherein the throttle valve actuating shaft is disposed contiguous to one of the throttle valve shafts.

16. An internal combustion engine as set forth in claim 15, wherein the one throttle valve shaft is at one end of the engine and the throttle valve shafts are all linked together by synchronizing couplings.

17. An internal combustion engine as set forth in claim 14, wherein the throttle valve actuating shaft is disposed between and directly actuates two of the throttle valve shafts, remaining throttle valve shafts being linked to one of said two throttle valve shafts by synchronizing couplings.

18. An internal combustion engine as set forth in claim 11, further including a single idle position stop and a single fully opened throttle position stop each cooperating directly with only one of the throttle valve shaft and the throttle valve actuating shaft.

19. An internal combustion engine as set forth in claim 1, wherein the valve actuating means comprises at least one cam shaft journalled for rotation by the cylinder head, flexible transmitter means for driving said cam shaft from an engine output shaft, a throttle valve actuator for operating said throttle valve juxtaposed to said flexible transmitter, and a throttle valve position sensor for sensing the position of said throttle valve spaced from said flexible transmitter.

20. An internal combustion engine as set forth in claim 19, wherein said engine has a plurality of in line cylinder bores each defining a respective combustion chamber formed and served as defined in claim 19, the cam shaft operating at least one of the valves associated with each of said cylinder bores.

21. An internal combustion engine as set forth in claim 20, wherein the flexible transmitter is at one end of said engine.

22. An internal combustion engine as set forth in claim 21, wherein the throttle position sensor is at the other end of said engine.

23. An internal combustion engine as set forth in claim 20, wherein the flexible transmitter is disposed between two of the cylinder bores.

24. An internal combustion engine as set forth in claim 23, wherein the throttle position sensor is at one end of said engine.

25. An internal combustion engine as set forth in claim 1, further including a fuel injector for injecting fuel into the intake passage upstream of the throttle valve, a fuel supply system for supplying fuel under pressure to said fuel injector, a pressure regulator for regulating the pressure of the fuel supplied by said fuel supply system to said fuel injector, and means for sensing the air pressure in said induction passage downstream of said throttle valve for setting the pressure regulated by said pressure regulator.

26. An internal combustion engine as set forth in claim 25, wherein said engine has a plurality of in line cylinder bores each defining a respective combustion chamber formed and served as defined in claim 25 and the means for sensing the air pressure comprises a sensing port in each intake passage downstream of the respective throttle valve and a single conduit connection all of said sensing ports to the pressure regulator.

27. An internal combustion engine as set forth in claim 26, wherein the pressure regulator is positioned at one end of a fuel rail that supplies fuel to the fuel injectors for the combustion chambers.

28. An internal combustion engine as set forth in claim 1, further including a fuel injector for injecting fuel into the intake passage upstream of the throttle valve and in a direction such that at least some of the fuel sprayed therefrom will impinge on a side of said throttle valve when said throttle valve is in the closed, idle position, said throttle valve side being the side that moves toward the intake port when said throttle valve is opened.

29. An internal combustion engine as set forth in claim 28, wherein some of the fuel from the fuel injector will also impinge on the throttle valve when said throttle valve is in its opened, full throttle position.

30. An internal combustion engine comprising a combustion chamber formed by a cylinder bore closed at one end by a cylinder head and by a piston reciprocating in said cylinder bore, at least one intake passage serving said combustion chamber through an intake port valved by an intake valve, a throttle valve in said intake passage upstream of said intake port moveable between an opened, full throttle position and a closed, idle position for controlling the flow through said intake passage into said combustion chamber, at least one exhaust passage serving said combustion chamber through an exhaust port, an exhaust valve for controlling the flow through said exhaust port, valve actuating means for operating said intake valve and said exhaust valve between their open and closed positions, said throttle valve being journaled on a throttle valve shaft journalled in said intake passage closely adjacent one side of said cylinder head, a throttle valve actuating shaft journalled for rotation about a throttle valve actuating shaft axis disposed parallel to the axis of said throttle valve shaft and at the side of said intake passage outwardly from said cylinder head, and motion transmitting means for transmitting rotation of said throttle valve actuating shaft into rotation of said throttle valve shaft.

31. An internal combustion engine as set forth in claim 30, wherein the motion transmitting means comprises a linkage system.

32. An internal combustion engine as set forth in claim 31, wherein the linkage system comprises first and second levers affixed for rotation with the throttle valve shaft and the throttle valve actuating shaft, respectively, and a link pivotally connected to each of said first and second levers.

33. An internal combustion engine as set forth in claim 31, wherein said engine has a plurality of in line cylinder bores each defining a respective combustion chamber formed and served as defined in claim 31, the intake passage serving each of said combustion chambers having a respective throttle valve and throttle valve shaft, the throttle valve actuating shaft operating all of said throttle valve shafts.

34. An internal combustion engine as set forth in claim 33, wherein the throttle valve actuating shaft is disposed contiguous to one of the throttle valve shafts.

35. An internal combustion engine as set forth in claim 34, wherein the one throttle valve shaft is at one end of the engine and the throttle valve shafts are all linked together by synchronizing couplings.

36. An internal combustion engine as set forth in claim 33, wherein the throttle valve actuating shaft is disposed between and directly actuates two of the throttle valve shafts, remaining throttle valve shafts being linked to one of said two throttle valve shafts by synchronizing couplings.

37. An internal combustion engine as set forth in claim 30, further including a single idle position stop and a single fully opened throttle position stop each cooperating directly with only one of the throttle valve shaft and the throttle valve actuating shaft.

38. An internal combustion engine comprising a combustion chamber formed by a cylinder bore closed at one end by a cylinder head and by a piston reciprocating in said cylinder bore, said piston driving an engine output shaft, at least one intake passage serving said combustion chamber through an intake port valved by an intake valve, a throttle valve in said intake passage upstream of said intake port moveable between an opened, full throttle position and a closed, idle position for controlling the flow through said intake passage into said combustion chamber, at least one exhaust passage serving said combustion chamber through an exhaust port, an exhaust valve for controlling the flow through said exhaust port, valve actuating means for operating said intake valve and said exhaust valve between their open and closed positions, said valve actuating means comprising at least one cam shaft journaled for rotation by said cylinder head, flexible transmitter means for driving said cam shaft from said engine output shaft, a throttle valve actuator for operating said throttle valve juxtaposed to said flexible transmitter, and a throttle valve position sensor for sensing the position of said throttle valve spaced from said flexible transmitter.

39. An internal combustion engine as set forth in claim 38, wherein said engine has a plurality of in line cylinder bores each defining a respective combustion chamber formed and served as defined in claim 38, the cam shaft operating at least one of the valves associated with each of said cylinder bores.

40. An internal combustion engine as set forth in claim 39, wherein the flexible transmitter is at one end of said engine.

41. An internal combustion engine as set forth in claim 40, wherein the throttle position sensor is at the other end of said engine.

42. An internal combustion engine as set forth in claim 39, wherein the flexible transmitter is disposed between two of the cylinder bores.

43. An internal combustion engine as set forth in claim 42, wherein the throttle position sensor is at one end of said engine.

* * * * *